United States Patent
Lei

(10) Patent No.: US 12,502,966 B2
(45) Date of Patent: Dec. 23, 2025

(54) STARTING SYSTEM AND ELECTRIC VEHICLE

(71) Applicant: SHENZHEN CARKU TECHNOLOGY CO., LIMITED, Guangdong (CN)

(72) Inventor: Yun Lei, Guangdong (CN)

(73) Assignee: Shenzhen Carku Technology Co., Limited, Shenzhen (CN)

(*) Notice: Subject to any disclaimer, the term of this patent is extended or adjusted under 35 U.S.C. 154(b) by 247 days.

(21) Appl. No.: 18/173,212

(22) Filed: Feb. 23, 2023

(65) Prior Publication Data
US 2023/0202303 A1  Jun. 29, 2023

Related U.S. Application Data

(63) Continuation of application No. PCT/CN2020/130475, filed on Nov. 20, 2020.

(51) Int. Cl.
*B60L 3/00* (2019.01)
*H02H 3/04* (2006.01)
(Continued)

(52) U.S. Cl.
CPC ............ *B60L 3/0046* (2013.01); *H02H 3/04* (2013.01); *H02H 3/18* (2013.01); *H02H 5/04* (2013.01);
(Continued)

(58) Field of Classification Search
CPC ............ B60L 3/0046; B60L 2240/547; B60L 2240/579; B60L 2250/10; H02H 3/04; H02H 3/18; H02H 5/04
See application file for complete search history.

(56) References Cited

U.S. PATENT DOCUMENTS

| | | | |
|---|---|---|---|
| 11,305,669 B2* | 4/2022 | Koyama | B60L 3/0007 |
| 2004/0130298 A1* | 7/2004 | Krieger | H02J 7/0034 |
| | | | 320/165 |

(Continued)

FOREIGN PATENT DOCUMENTS

| | | |
|---|---|---|
| CN | 105680505 A | 6/2016 |
| CN | 108448344 A | 8/2018 |

(Continued)

OTHER PUBLICATIONS

The extended European search report issued in corresponding EP application No. 20951176.5 dated Feb. 19, 2024.
(Continued)

*Primary Examiner* — Peter D Nolan
*Assistant Examiner* — Mikko Okechukwu Obioha
(74) *Attorney, Agent, or Firm* — Hauptman Ham, LLP

(57) ABSTRACT

A starting system is provided. The starting system is applicable to a device to-be-started including a startable battery, and the startable battery includes a positive electrode and a negative electrode. The starting system includes a processor and a forward-connection detecting module. The forward-connection detecting module includes a first detecting sub-module and a first transistor. The first detecting sub-module is configured to detect an electrical signal received by each of the positive electrode and the negative electrode. The first detecting sub-module is configured to generate a forward-connection electrical signal when the first detecting sub-module detects that the positive electrode receives a positive electrical signal provided by a power-supply device and the negative electrode receives a negative electrical signal provided by the power-supply device. The first detecting sub-module is configured to send, via the first transistor, the forward-connection electrical signal to the processor, in such a manner that the processor enters a normal working state.

20 Claims, 12 Drawing Sheets

(51) Int. Cl.
*H02H 3/18* (2006.01)
*H02H 5/04* (2006.01)

(52) U.S. Cl.
CPC ... *B60L 2240/547* (2013.01); *B60L 2240/549* (2013.01); *B60L 2250/10* (2013.01)

(56) References Cited

U.S. PATENT DOCUMENTS

| | | | | |
|---|---|---|---|---|
| 2012/0101677 | A1* | 4/2012 | Ikegami | B60L 15/20 180/65.265 |
| 2015/0022158 | A1* | 1/2015 | Osawa | G01R 31/367 320/134 |
| 2015/0318811 | A1* | 11/2015 | Ota | B60L 58/27 318/139 |
| 2017/0163201 | A1* | 6/2017 | Nakamoto | H02P 29/024 |
| 2018/0246172 | A1* | 8/2018 | Abe | H01M 10/486 |
| 2020/0328478 | A1* | 10/2020 | Nozawa | B60L 3/0046 |

FOREIGN PATENT DOCUMENTS

| | | |
|---|---|---|
| CN | 108828463 A | 11/2018 |
| CN | 108923533 A | 11/2018 |
| CN | 111048826 A | 4/2020 |
| CN | 210273514 U | 4/2020 |
| CN | 210957896 U | 7/2020 |
| CN | 214450306 U | 10/2021 |
| EP | 0252309 A1 | 1/1988 |
| FR | 2969069 A1 | 6/2012 |
| JP | H06350741 A | 12/1994 |
| WO | 2016193803 A1 | 12/2016 |

OTHER PUBLICATIONS

The first office action issued in corresponding CA application No. 3,126,399 dated Oct. 19, 2022.
WIPO, International Search Report and Written Opinion for International Application No. PCT/CN2020/130475, Feb. 18, 2021.
First Office Action issued in corresponding CN application No. 202010868870.6 dated Dec. 5, 2024.
Second Office Action issued in corresponding CN application No. 202010868870.6 dated Jun. 19, 2025.
Third Office Action issued in corresponding CA application No. 3,126,399 dated Nov. 4, 2024.
Extended European Search Report issued in corresponding EP application No. 20951176.5 dated Feb. 19, 2024.

* cited by examiner

STARTING SYSTEM AND ELECTRIC VEHICLE

CROSS-REFERENCE TO RELATED APPLICATION (S)

This application is a continuation of International Application No. PCT/CN2020/130475, filed on Nov. 20, 2020, which claims priority to Chinese Patent Application No. 202021802101.8, filed on Aug. 25, 2020 and Chinese Patent Application No. 202010868870.6, filed on Aug. 25, 2020, the disclosures of which are hereby incorporated by reference in their entireties.

TECHNICAL FIELD

This disclosure relates to the field of starting technology, and more particularly to a starting system and an electric vehicle.

BACKGROUND

With development of new-energy vehicles, bicycles, and other transportation tools, a primary problem of new-energy transportation tools is how to start a transportation tool safely and quickly. At present, most devices used for detecting a starting signal of a starting device are optoelectronic isolation devices. Due to limitations in parameter transmission ratio and response time of the optoelectronic isolation device, it is impossible to promptly transmit an abnormality signal to a processor, which may cause damage to a system circuit or affect personal and property safety.

SUMMARY

In a first aspect, a starting system is provided. The starting system is applicable to a device to-be-started, where the device to-be-started includes a startable battery, and the startable battery includes a positive electrode and a negative electrode. The starting system includes a processor and a forward-connection detecting module. The forward-connection detecting module includes a first detecting sub-module and a first transistor. The first detecting sub-module is configured to operate as follows. The first detecting sub-module is configured to detect an electrical signal received by each of the positive electrode and the negative electrode. The first detecting sub-module is configured to generate a forward-connection electrical signal when the first detecting sub-module detects that the positive electrode receives a positive electrical signal provided by a power-supply device and the negative electrode receives a negative electrical signal provided by the power-supply device. The first detecting sub-module is configured to send, via the first transistor, the forward-connection electrical signal to the processor, in such a manner that the processor enters a normal working state.

In a second aspect, an electric vehicle is provided. The electric vehicle includes a storage battery and the starting system described in the first aspect. The starting system is configured to start the storage battery.

BRIEF DESCRIPTION OF THE DRAWINGS

In order to describe more clearly technical solutions of implementations, the following will give a brief introduction to the accompanying drawings used for describing implementations. Apparently, the accompanying drawings hereinafter described are merely some implementations of the disclosure. Based on these drawings, those of ordinary skill in the art can also obtain other drawings without creative effort.

DETAILED DESCRIPTION

Technical solutions of implementations will be hereinafter described clearly and comprehensively in connection with the accompanying drawings. Apparently, implementations described herein are merely some implementations, rather than all implementations, of the disclosure. All other implementations obtained by those of ordinary skill in the art based on implementations described herein without creative effort shall fall within the protection scope of the disclosure.

Figure 1:
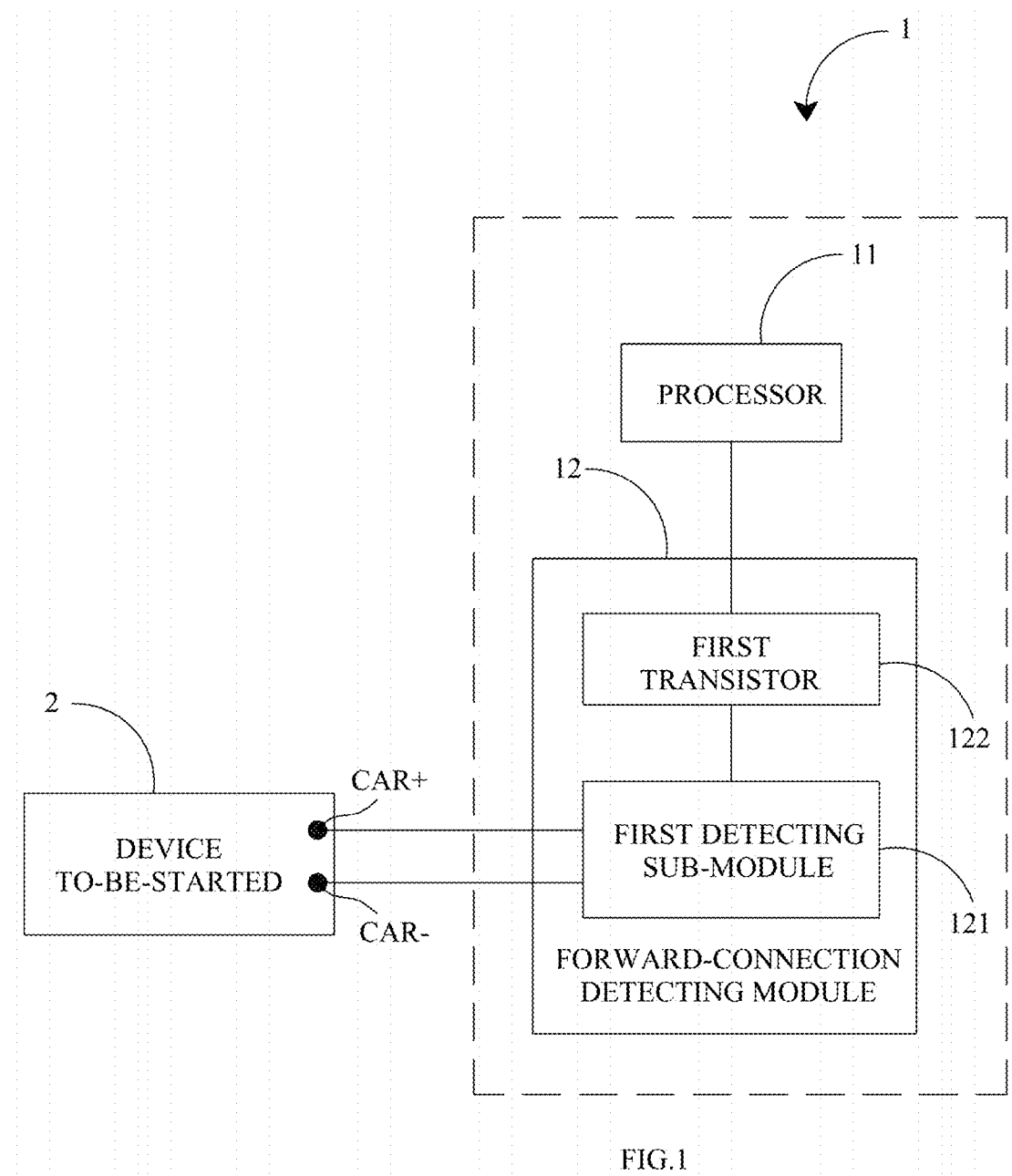
FIG. 1 is a schematic framework diagram of a starting system according to implementations.

Implementations provide a starting system 1 which is applicable to a device to-be-started 2. FIG. 1 is a schematic framework diagram of a starting system according to implementations. As illustrated in FIG. 1, the starting system 1 includes a processor 11 and a forward-connection detecting module 12. The device to-be-started 2 includes a positive electrode CAR+ and a negative electrode CAR−. The processor 11 is electrically connected with the forward-connection detecting module 12. The forward-connection detecting module 12 includes a first detecting sub-module 121 and a first transistor 122. The first detecting sub-module 121 is configured to operate as follows. The first detecting sub-module 121 is configured to detect an electrical signal received by each of the positive electrode CAR+ and the negative electrode CAR−. The first detecting sub-module 121 is configured to generate a forward-connection electrical signal upon detecting that the positive electrode CAR+ receives a positive electrical signal and the negative electrode CAR− receives a negative electrical signal. The first detecting sub-module 121 is configured to send, via the first transistor 122, the forward-connection electrical signal to the processor 11, such that the processor 11 enters a normal working state.

According to implementations herein, the device to-be-started 2 is an electronic device having a startable battery, for example, an electric vehicle or the like. The processor 11 is a chip having computing ability. The electrical signal received by each of the positive electrode CAR+ and the negative electrode CAR− is usually provided by a power-supply device external to the starting system 1, such as a storage battery. In other words, the power-supply device provides the positive electrical signal and the negative electrical signal.

When the positive electrode CAR+ receives the positive electrical signal and the negative electrode CAR− receives the negative electrical signal, the first detecting sub-module 121 generates the forward-connection electrical signal to be sent, via the first transistor 122, to the processor 11.

It can be understood that, according to implementations herein, since the first transistor 122 can be switched on/off quickly, by transmitting the forward-connection electrical signal to the processor 11, it is possible to quickly respond to an interrupt-control signal, to avoid abnormality of the starting system 1 due to connection to a power supply by mistake, which can significantly improve safety and reliability in a starting process.

Figure 2:
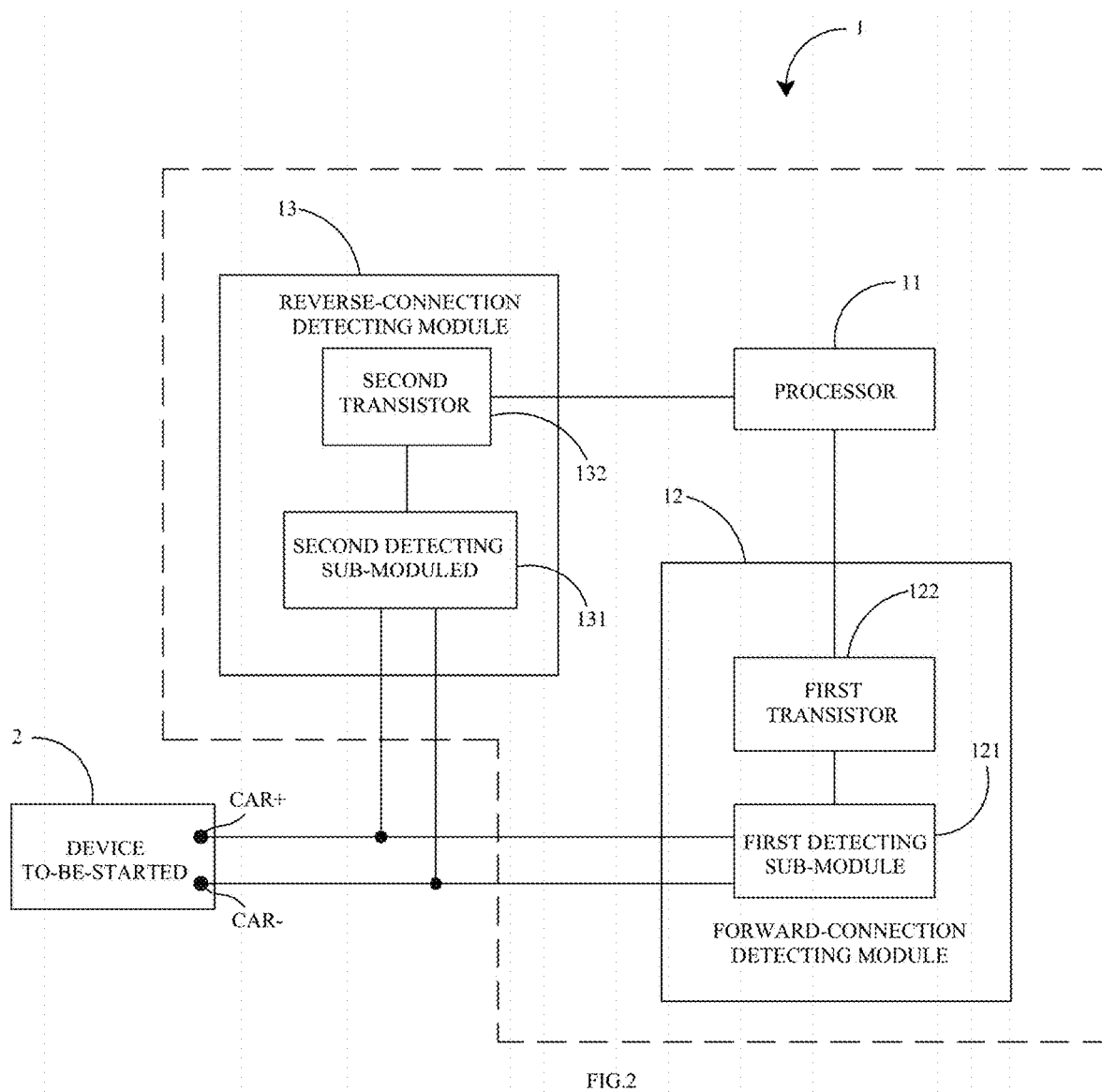
FIG. 2 is a schematic framework diagram of a starting system according to other implementations.

FIG. 2 is a schematic framework diagram of a starting system according to other implementations. As illustrated in FIG. 2, in some implementations, the starting system further includes a reverse-connection detecting module 13. The reverse-connection detecting module 13 is electrically connected with the processor 11 and includes a second detecting sub-module 131 and a second transistor 132. The second detecting sub-module 131 is configured to operate as follows. The second detecting sub-module 131 is configured to detect the electrical signal received by each of the positive electrode CAR+ and the negative electrode CAR−. The second detecting sub-module 131 is configured to generate a reverse-connection electrical signal upon detecting that the positive electrode CAR+ receives the negative electrical signal and the negative electrode CAR− receives the positive electrical signal. The second detecting sub-module 131 is configured to send, via the second transistor 132, the reverse-connection electrical signal to the processor 11, such that the processor 11 enters an abnormality reminding state.

It can be understood that, when the positive electrode CAR+ receives the negative electrical signal and the negative electrode CAR− receives the positive electrical signal, that is, a circuit in the device to-be-started 2 is reversely connected with the power-supply device, it will cause an electronic component in the device to-be-started 2 to serious damage. The second detecting sub-module 131 generates the reverse-connection electrical signal to be sent, via the second transistor 132, to the processor 11. After the processor 11 enters the abnormality reminding state, the positive electrical signal and the negative electrical signal of the power-supply device will not be received by the device to-be-started 2, thereby protecting the electronic component in the device to-be-started 2.

Similar to the foregoing implementations, since the second transistor 132 can be switched on/off quickly, by transmitting the reverse-connection electrical signal to the processor 11, it is possible to quickly respond to an interrupt-control signal, thereby avoiding damage to electronic components due to reverse connection to the power-supply device.

Figure 3:
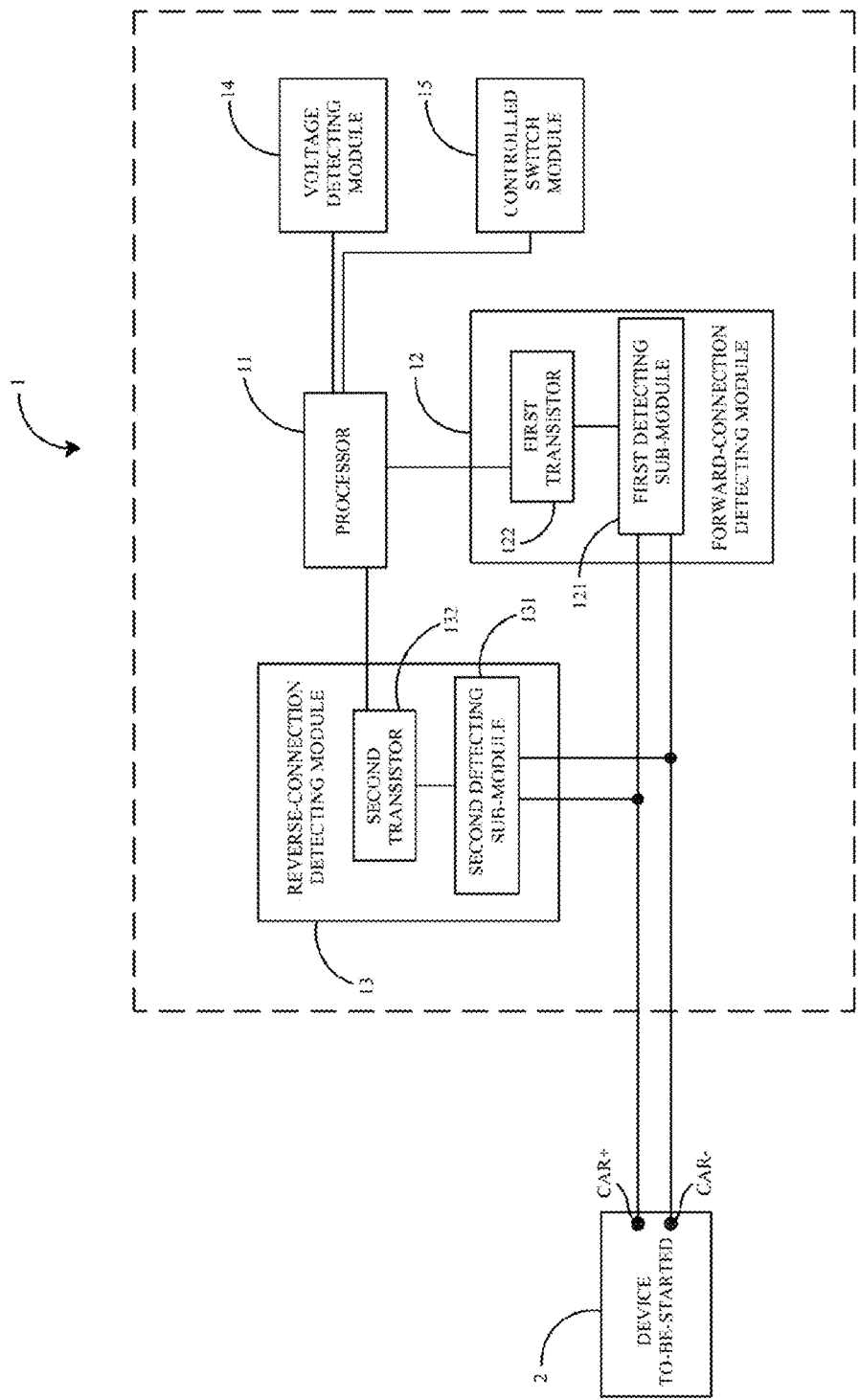
FIG. 3 is a schematic framework diagram of a starting system according to other implementations.

FIG. 3 is a schematic framework diagram of a starting system according to other implementations. As illustrated in FIG. 3, in some implementations, the starting system 1 further includes a voltage detecting module 14. The voltage detecting module 14 is electrically connected with the processor 11. The voltage detecting module 14 is configured to obtain an input voltage value according to the positive electrical signal and the negative electrical signal and to send in real time the input voltage value to the processor 11. The processor 11 is configured to control the starting system 1 to work when a slope of the input voltage value decreases to a preset threshold slope and the processor 11 is in the normal working state.

According to implementations herein, the starting system 1 further includes a controlled switch module 15. The positive electrical signal and the negative electrical signal are provided by a power-supply device external to the starting system 1. In general, the starting system 1 is applicable to the device to-be-started 2, and the positive electrical signal and the negative electrical signal are applied to the device to-be-started 2 via the starting system 1. When the device to-be-started 2 is started, since a new load has been added, the input voltage value obtained according to the positive electrical signal and the negative electrical signal begins to decrease. The voltage detecting module 14 sends in real time the input voltage value to the processor 11. The processor 11 can calculate a drop slope of the input voltage value. The slope of the input voltage value may be representative of a resistance value in a circuit. When the slope of the input voltage value decreases to the preset threshold slope, that is, a proper starting resistance value has been reached in a circuit, the processor 11 controls the controlled switch module 15 to be on. It can be understood that, the preset threshold slope may vary according to different devices to-be-started 2.

"The starting system 1 works" means that after the processor 11 controls the controlled switch module 15 to be on, the positive electrical signal will be applied to the positive electrode CAR+ via the controlled switch module 15 and the negative electrical signal will be applied to the negative electrode CAR− via the controlled switch module 15, such that the power-supply device starts the device to-be-started 2 via the starting system 1.

Figure 4:
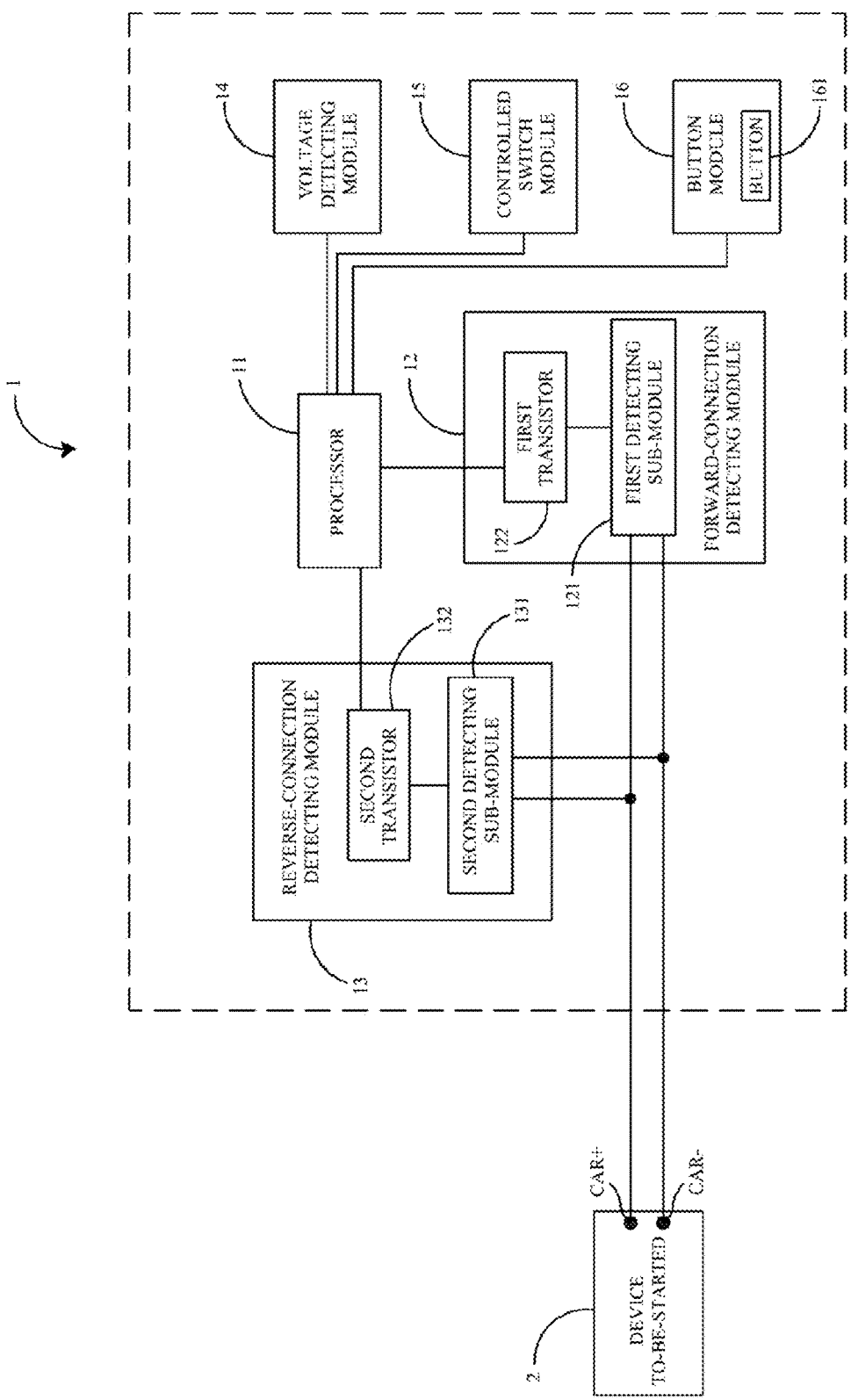
FIG. 4 is a schematic framework diagram of a starting system according to other implementations.

FIG. 4 is a schematic framework diagram of a starting system according to other implementations. As illustrated in FIG. 4, in some implementations, the starting system 1 further includes a button module 16. The button module 16 is electrically connected with the processor 11. The button module 16 is configured to send a button signal to the processor 11 when the input voltage value is greater than or equal to a preset threshold voltage and the button module 16 generates the button signal. The processor 11 is further configured to control, according to the button signal, the starting system 1 to work.

Different from the foregoing implementations, as another manner of starting, the starting system further includes a controlled switch module 15. The positive electrical signal and the negative electrical signal are provided by a power-supply device internal to the starting system 1. In general, the button module 16 includes a button 161. When the button 161 is depressed, the button module 16 generates the button signal. When the input voltage value is greater than or equal to the preset threshold voltage (that is, the input voltage value satisfies a condition for the device to-be-started 2 to be started) and the button module 16 generates the button signal, the processor 11 controls, according to the button signal, the controlled switch module 15 to be on, such that the starting system 1 works and the power-supply device starts the device to-be-started 2 via the starting system 1. It can be understood that, the preset threshold voltage may vary according to different devices to-be-started 2.

Figure 5:
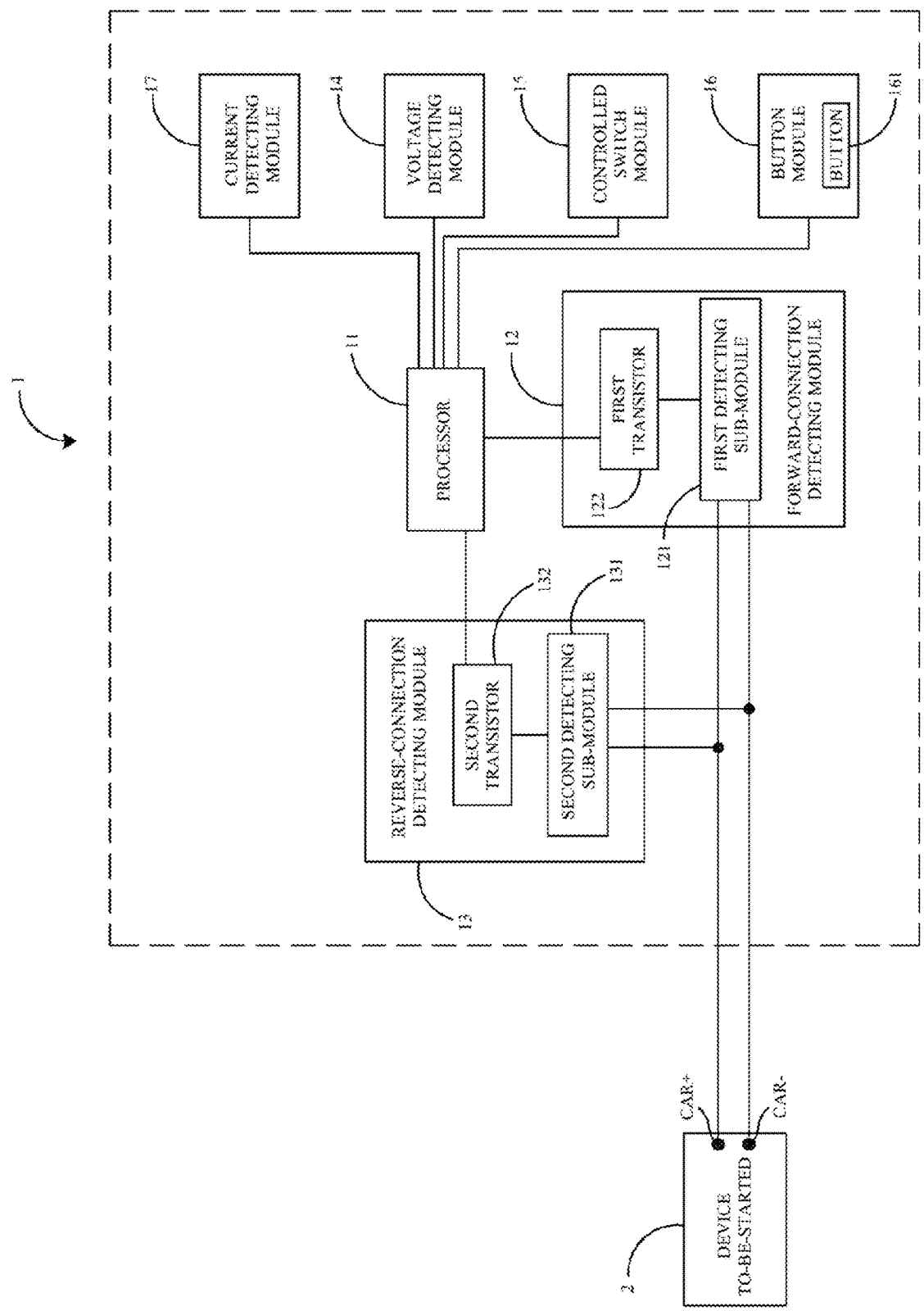
FIG. 5 is a schematic framework diagram of a starting system according to other implementations.

FIG. 5 is a schematic framework diagram of a starting system according to other implementations. As illustrated in FIG. 5, in some implementations, the starting system 1 further includes a current detecting module 17. The current detecting module 17 is electrically connected with the processor 11. The current detecting module 17 is configured to obtain an input current value according to the positive electrical signal and the negative electrical signal when the starting system 1 works and to send an interrupt electrical signal to the processor 11 when the input current value is greater than a preset threshold current. The processor 11 is configured to control, according to the interrupt electrical signal, the starting system 1 to stop working.

When the starting system 1 works, that is, the device to-be-started 2 has been started, if the input current value is too large, it may result in damage to an electronic component in the device to-be-started 2. When the input current value is greater than the preset threshold current, the current detecting module 17 sends the interrupt electrical signal to the processor 11. The processor 11 controls, according to the interrupt electrical signal, the controlled switch module 15 to be off, such that the positive electrical signal stops being applied to the positive electrode CAR+ and the negative electrical signal stops being applied to the negative electrode CAR−, and as such, the device to-be-started 2 stops working. It can be understood that, the preset threshold current can vary according to a current value that can be born by the device to-be-started 2.

Figure 6:
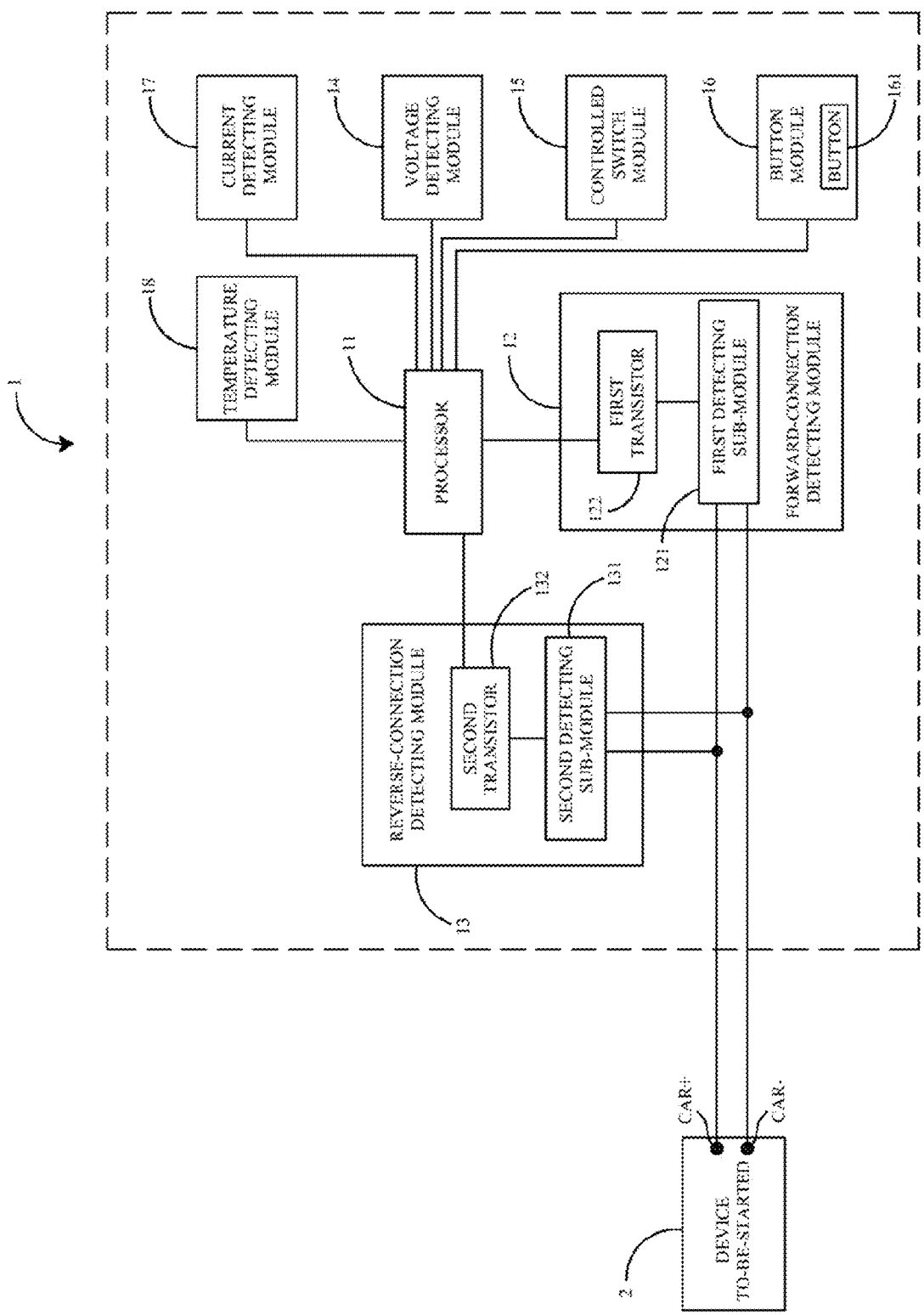
FIG. 6 is a schematic framework diagram of a starting system according to other implementations.

FIG. 6 is a schematic framework diagram of a starting system according to other implementations. As illustrated in FIG. 6, the starting system 1 further includes a temperature detecting module 18. The temperature detecting module 18 is electrically connected with the processor 11. The temperature detecting module 18 is configured to detect a temperature value of an electronic component in the starting system 1 when the starting system 1 works and to send an interrupt electrical signal to the processor 11 when the temperature value is greater than a preset threshold temperature. The processor 11 is configured to control, according to the interrupt electrical signal, the starting system 1 to stop working.

According to implementations herein, the starting system 1 further includes a controlled switch module 15. When the starting system 1 works, that is, the device to-be-started 2 has been started, since a current flows through the controlled switch module 15, the controlled switch module 15 will generate heat. As working time is prolonged, it may result in damage to an electronic component in the controlled switch module 15. When the temperature value is greater than the preset threshold temperature, the temperature detecting module 18 sends the interrupt electrical signal to the processor 11. The processor 11 controls, according to the interrupt electrical signal, the controlled switch module 15 to be off, such that the positive electrical signal stops being applied to the positive electrode CAR+ and the negative electrical signal stops being applied to the negative electrode CAR−, to stop the device to-be-started 2 from working. It can be understood that, the preset threshold temperature can vary according to a temperature value that can be born by the controlled switch module 15.

Figure 7:
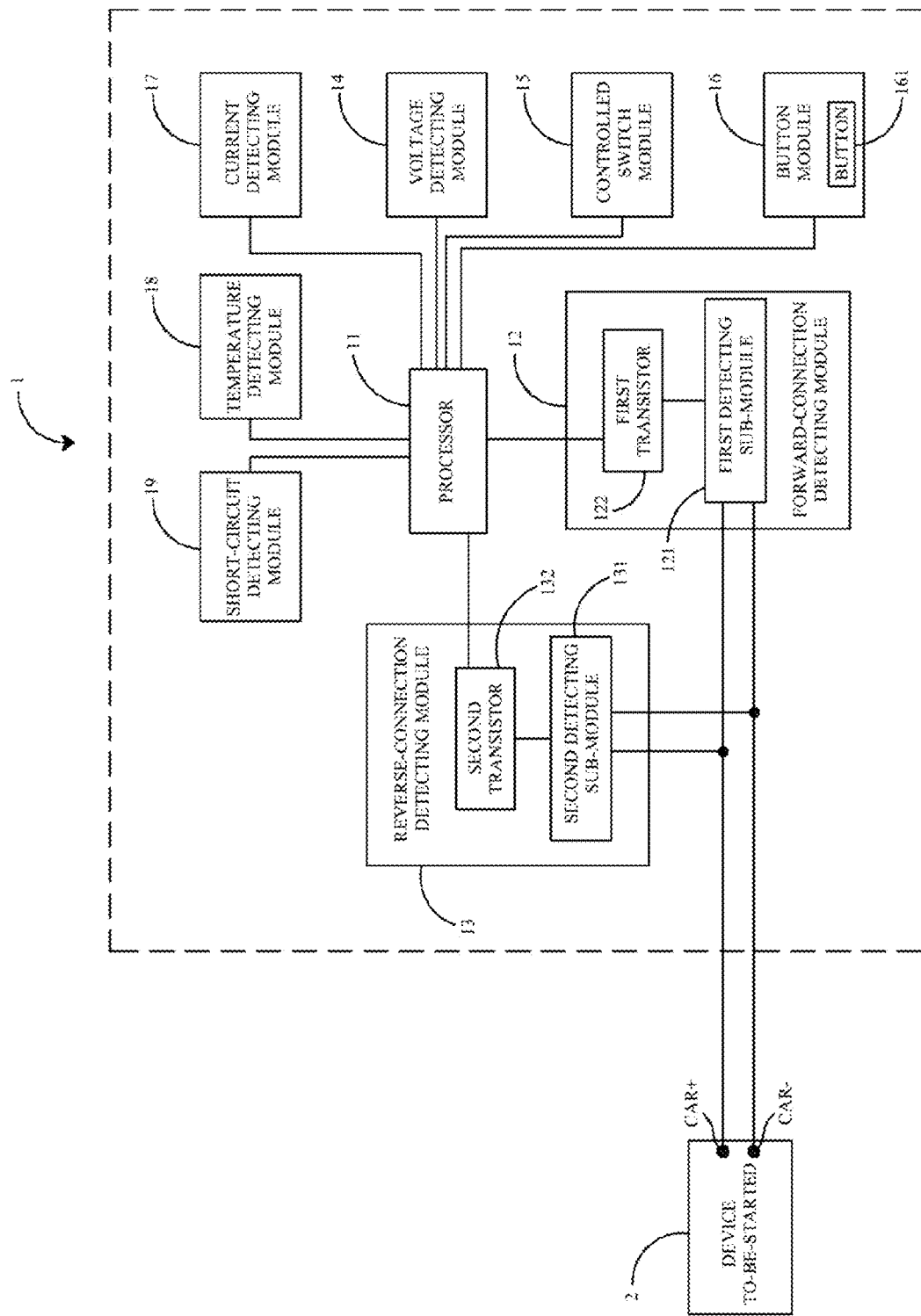
FIG. 7 is a schematic framework diagram of a starting system according to other implementations.

FIG. 7 is a schematic framework diagram of a starting system according to other implementations. As illustrated in FIG. 7, in some implementations, the starting system 1 further includes a short-circuit detecting module 19. The short-circuit detecting module 19 is electrically connected with the processor 11. The short-circuit detecting module 19 is configured to operate as follows. The short-circuit detecting module 19 is configured to detect whether there is short circuit between the positive electrode CAR+ and the negative electrode CAR−, when the positive electrode CAR+ receives the positive electrical signal and the negative electrode CAR− receives the negative electrical signal. The short-circuit detecting module 19 is configured to send a short-circuit electrical signal to the processor 11 when there is short circuit between the positive electrode CAR+ and the negative electrode CAR−, such that the processor 11 enters an abnormality reminding state.

Figure 8:
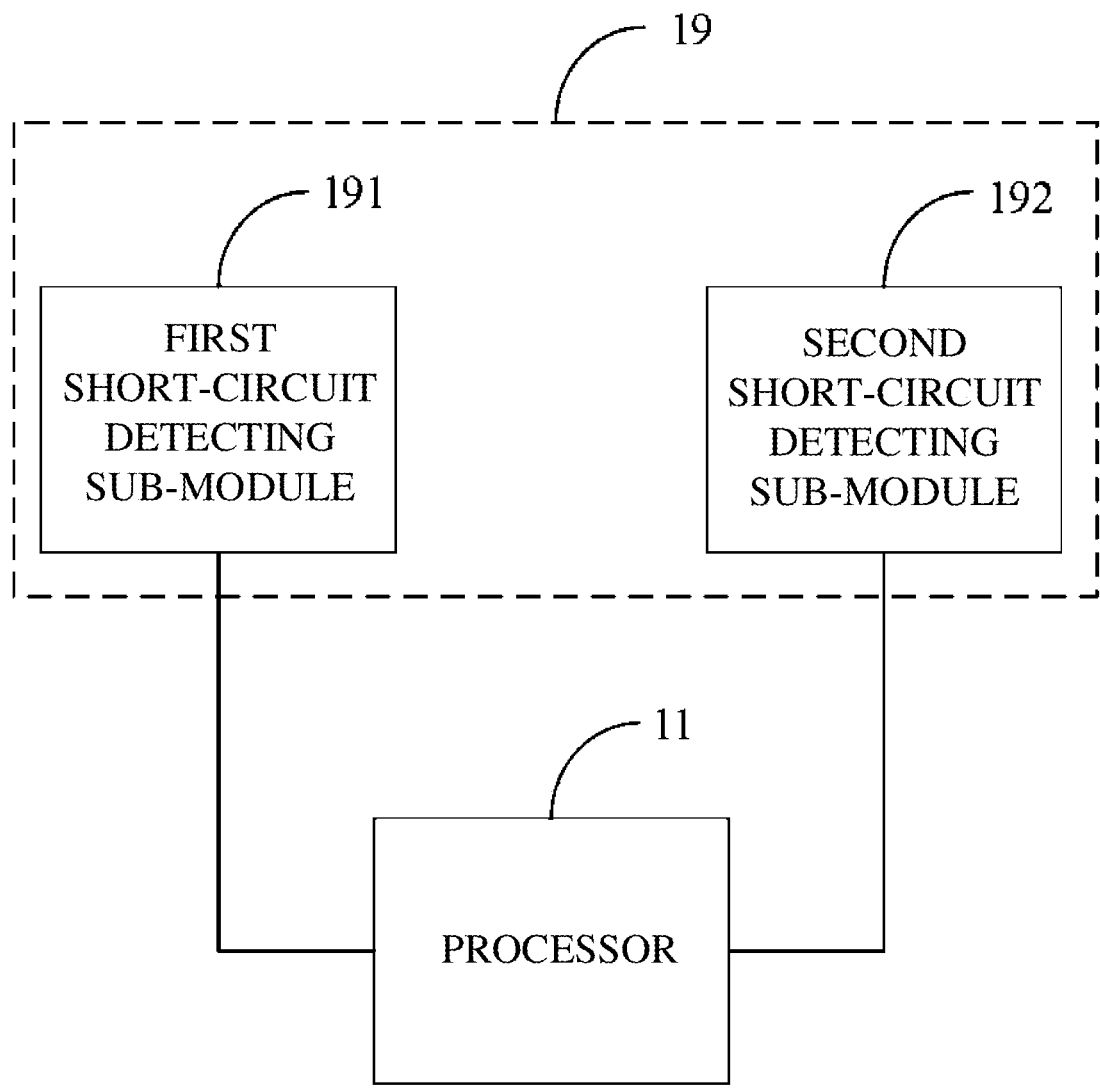
FIG. 8 is a schematic framework diagram of a short-circuit detecting module according to implementations.

The short-circuit detecting module 19 may detect existence of short-circuit after the device to-be-started 2 is started or before the device to-be-started 2 is started. FIG. 8 is a schematic framework diagram of the short-circuit detecting module according to implementations. As illustrated in FIG. 8, the short-circuit detecting module 19 includes a first short-circuit detecting sub-module 191. The first short-circuit detecting sub-module 191 is configured to detect whether there is short circuit between the positive electrode CAR+ and the negative electrode CAR−, before the forward-connection detecting module 12 generates the forward-connection electrical signal or the reverse-connection detecting module 13 generates the reverse-connection electrical signal.

In other implementations, as illustrated in FIG. 8, the short-circuit detecting module 19 further includes a second short-circuit detecting sub-module 192. The second short-circuit detecting sub-module 192 is configured to detect whether there is short circuit between the positive electrode CAR+ and the negative electrode CAR−, when the starting system 1 works.

It can be understood that, besides the short-circuit detecting module 19 as hardware, existence of short-circuit between the positive electrode CAR+ and the negative electrode CAR− can also be detected by means of computer software, and the disclosure is not limited in this regard.

Figure 9:
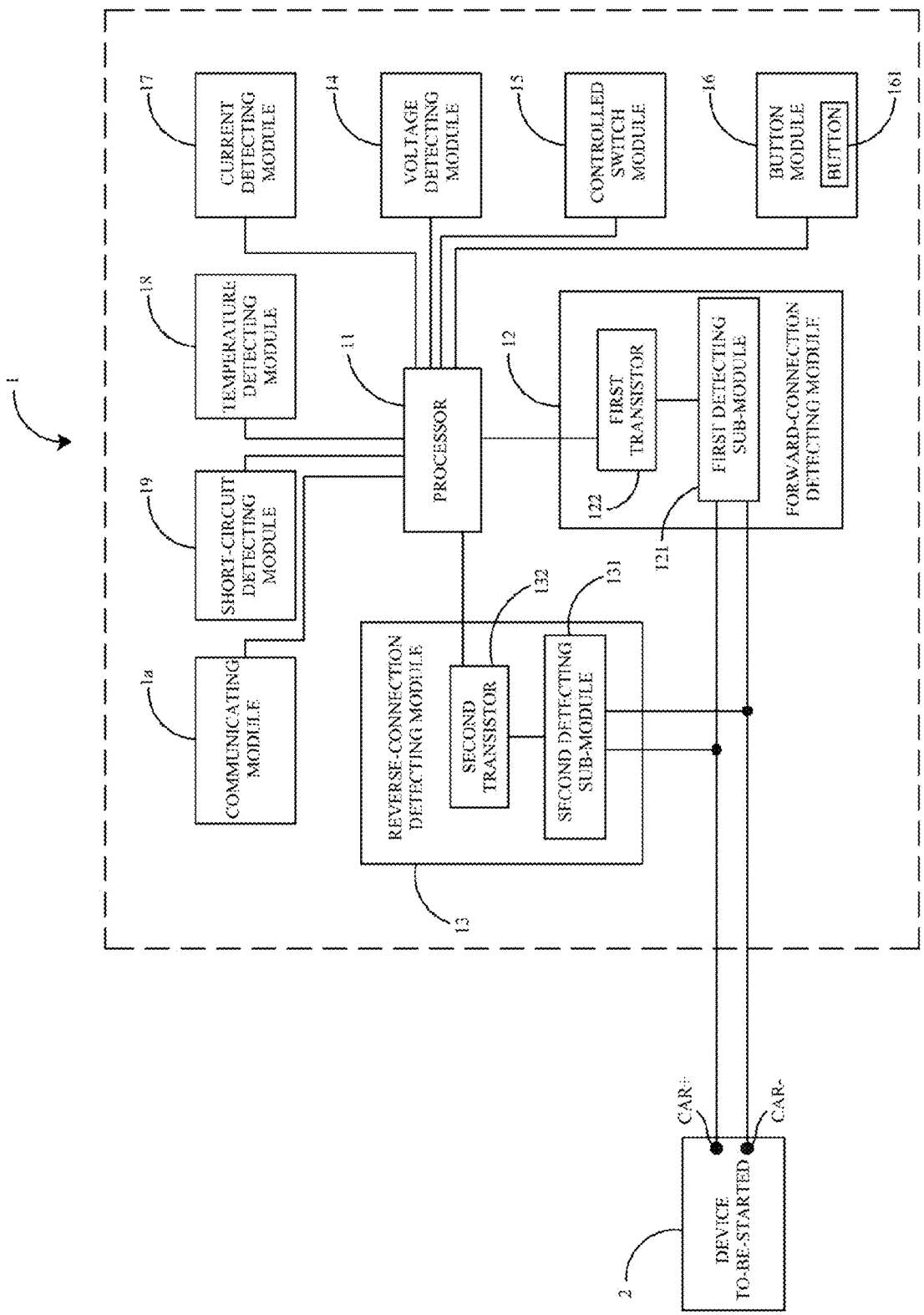
FIG. 9 is a schematic framework diagram of a starting system according to other implementations.

FIG. 9 is a schematic framework diagram of a starting system according to other implementations. As illustrated in FIG. 9, in some implementations, the starting system 1 further includes a communicating module 1a. The communicating module 1a is configured to operate as follows. The communicating module 1a is configured to store a communication protocol. The communicating module 1a is configured to perform data interchange, according to the communication protocol, with the power-supply device which provides the positive electrical signal and the negative electrical signal. The communicating module 1a is configured to determine, according to the positive electrical signal and the negative electrical signal, whether an output capability of the power-supply device satisfies an output condition.

In some implementations, the communication protocol stored in the communicating module 1a may be, but is not limited to, a controller area network (CAN) communication protocol, a vehicle area network (VAN) communication protocol, and the like. The communicating module 1a establishes communication with the power-supply device by selecting one by one communication protocols stored in the communicating module 1a. When the communicating module 1a selects a communication protocol which is the same as that of the power-supply device, the communicating module 1a establishes communication successfully with the power-supply device. The communicating module 1a performs data interchange, according to the communication protocol, with the power-supply device which provides the positive electrical signal and the negative electrical signal.

In addition, when the communicating module 1a determines that the output capability of the power-supply device satisfies the output condition, the communicating module 1a sends a data signal to the processor 11, such that the processor 11 controls, according to the data signal, the controlled switch module 15 to be on, and thus the positive electrical signal is applied to the positive electrode CAR+ and the negative electrical signal is applied to the negative electrode CAR−.

Figure 10:
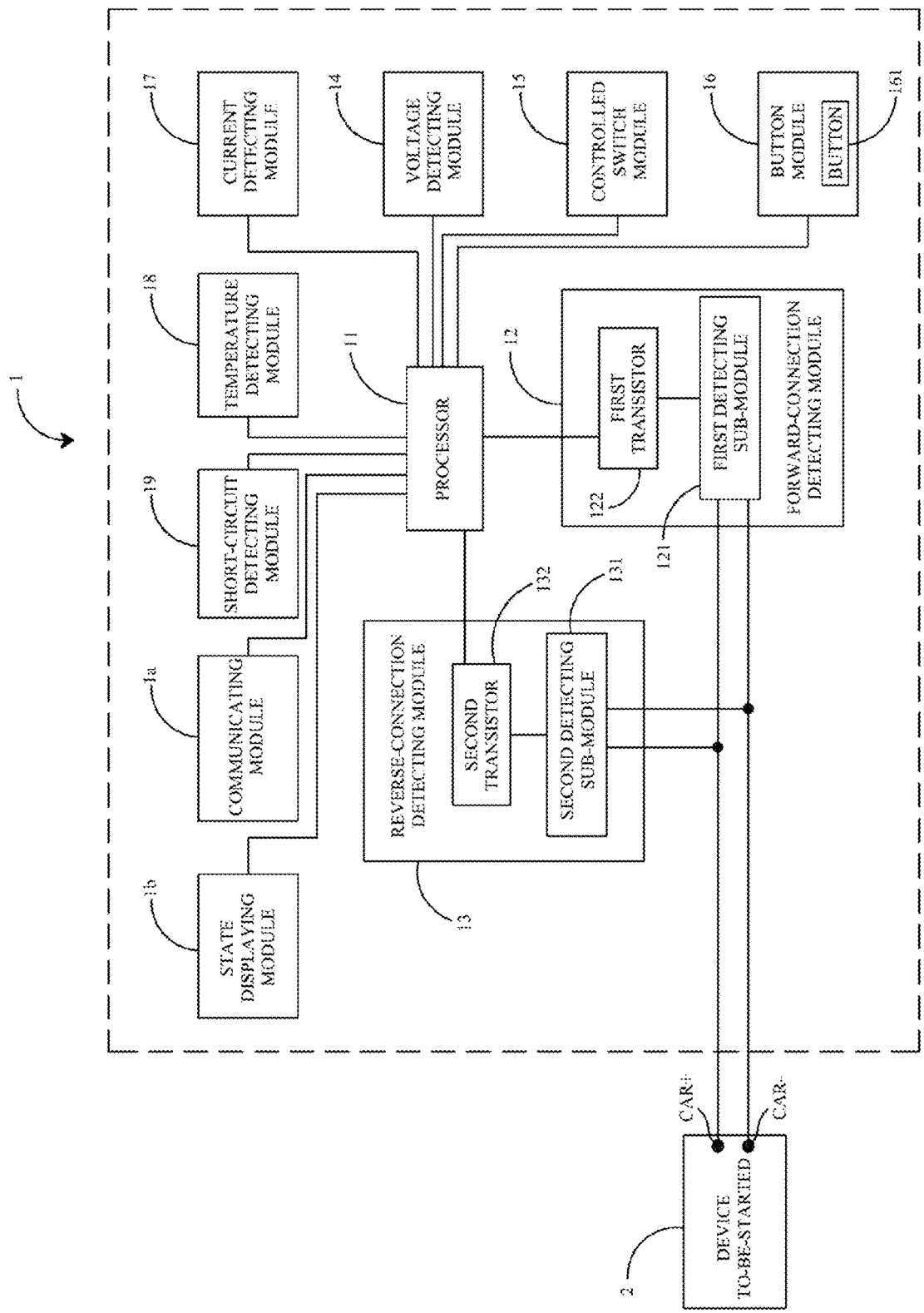
FIG. 10 is a schematic framework diagram of a starting system according to other implementations.

FIG. 10 is a schematic framework diagram of a starting system according to other implementations. As illustrated in FIG. 10, in some implementations, the starting system 1 further includes a state displaying module 1b. The state displaying module 1b is configured to display a working state of the starting system 1.

The state displaying module 1b may include a light source such as a light-emitting diode (LED) lamp, a buzzer, or the like. When the state displaying module 1b includes the LED lamp, different display colors of the LED lamp represent different working states of the starting system 1. For example, when the processor 11 is in the abnormality reminding state, the LED lamp is in red. When the processor 11 is in the normal working state, the LED lamp is in green. It can be understood that, the state displaying module 1b may also display a state in other manners, and the disclosure is not limited in this regard. When the state displaying module 1b includes the buzzer, the working state of the starting system 1 can be determined according to whether the buzzer sounds. For example, when the processor 11 is in the abnormality reminding state, the buzzer sounds. When the processor 11 is in the normal working state, the buzzer generates no sound. It can be understood that, the state displaying module 1b provided herein can visually display a state of the processor 11, thereby providing visual information to a user.

Figure 11:
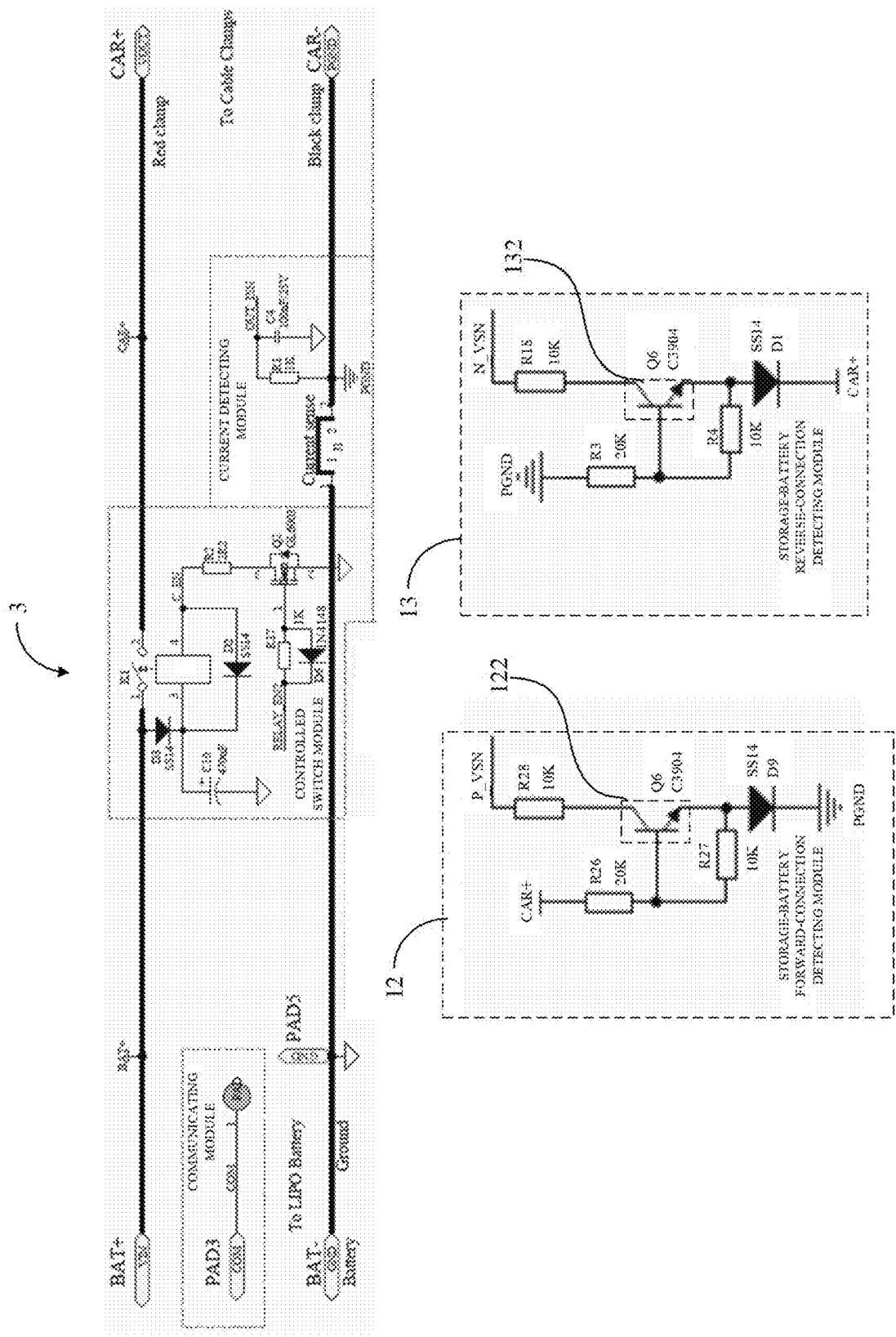
FIG. 11 is a schematic diagram illustrating part of a starting circuit according to implementations.

Implementations further provide a starting circuit 3. The starting circuit 3 is applicable to the starting system 1. FIG. 11 is a schematic diagram illustrating part of a starting circuit according to implementations. For details of various electronic components in the starting circuit 3, reference can be made to FIG. 11.

As illustrated in FIG. 11, in implementations herein, the positive electrical signal is generated by node BAT+, and the negative electrical signal is generated by node BAT−. The negative electrode CAR− is grounded, that is, the negative electrode CAR− and a ground line are kept at the same potential. In an electrical connection, if there is a node which is grounded, the node can be considered to be electrically connected with the negative electrode CAR−.

In some implementations, the forward-connection detecting module 12 further includes a first resistor R26, a second resistor R27, and a third resistor R28. The first resistor R26 has one end electrically connected with the positive electrode CAR+ and the other end electrically connected with a base of the first transistor 122 and one end of the second resistor R27. The second resistor R27 has the other end electrically connected with an emitter of the first transistor 122. The third resistor R28 has one end electrically connected with the processor 11 and the other end electrically connected with a collector with the first transistor 122. The forward-connection detecting module 12 further includes a forward-connected diode D9. The forward-connected diode D9 has one end electrically connected with the emitter of the first transistor 122 and the other end grounded.

It can be understood that, due to existence of the forward-connected diode D9, current can only flow from one end of the emitter of the first transistor 122 into the forward-connected diode D9. In other words, when the positive electrode CAR+ receives the positive electrical signal and the negative electrode CAR− receives the negative electrical signal, a circuit in the forward-connection detecting module 12 is on, such that the first transistor 122 sends the forward-connection electrical signal to the processor 11.

In some implementations, the reverse-connection detecting module 13 further includes a fourth resistor R3, a fifth resistor R4, and a sixth resistor R18. The fourth resistor R3 has one end grounded and the other end electrically connected with a base of the second transistor 132 and one end of the fifth resistor R4. The fifth resistor R4 has the other end electrically connected with an emitter of the second transistor 132. The sixth resistor R18 has one end electrically connected with the processor 11 and the other end electrically connected with a collector of the second transistor 132. The reverse-connection detecting module further includes a reverse-connected diode D1. The reverse-connected diode D1 has one end electrically connected with the emitter of the second transistor 132 and the other end electrically connected with the positive electrode CAR+.

It can be understood that, due to existence of the reverse-connected diode D1, current can only flow from one end of the emitter of the second transistor 132 into the reverse-connected diode D1. In other words, when the positive electrode CAR+ receives the negative electrical signal and the negative electrode CAR− receives the positive electrical signal, a circuit in the reverse-connection detecting module 13 is on, such that the second transistor 132 sends the reverse-connection electrical signal to the processor 11.

Figure 12:
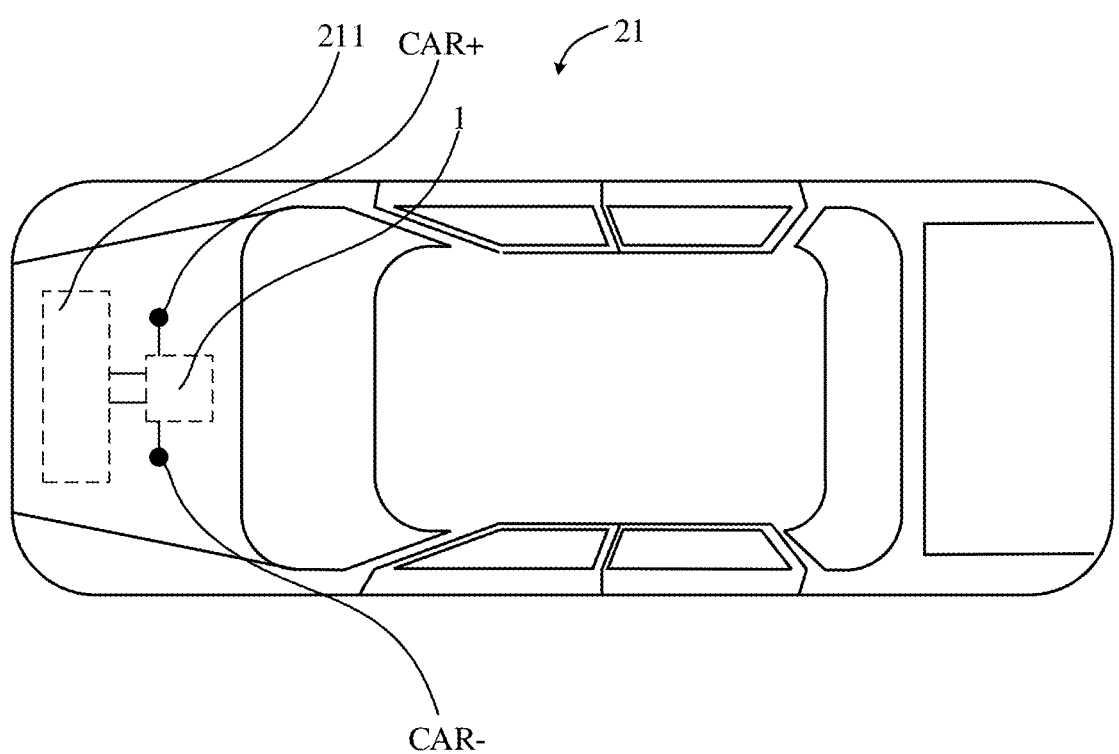
FIG. 12 is a schematic plan view of an electric vehicle according to implementations.

Implementations further provide an electric vehicle. FIG. 12 is a schematic plan view of an electric vehicle according to implementations. As illustrated in FIG. 12, the electric vehicle 21 includes a storage battery 211, a positive electrode CAR+, a negative electrode CAR−, and the starting system 1 described in the foregoing implementations. When the starting system 1 works, a positive electrical signal generated by the storage battery 211 is applied to the positive electrode CAR+ and a negative electrical signal generated by the storage battery 211 is applied to the negative electrode CAR−, such that the electric vehicle 21 is started.

The storage battery 211 is used as a power-supply device to provide the positive electrical signal and the negative electrical signal. For details of the starting system 1, reference can be made to the foregoing description, which will not be repeated herein. When the starting system 1 works, the positive electrical signal is applied to the positive electrode CAR+ via the controlled switch module 15 of the starting system 1 and the negative electrical signal is applied to the negative electrode CAR− via the controlled switch module 15, such that the electric vehicle 21 is started and then begins working.

It can be understood that, the starting system 1 provided herein is high in safety and reliability, which reduces risk of fault during working of the electric vehicle 21.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A starting system, being applicable to a device to-be-started comprising a startable battery comprising a positive electrode and a negative electrode, the starting system comprising:

a processor; and a forward-connection detecting module comprising a first detecting sub-module and a first transistor, wherein the first detecting sub-module is configured to:
  detect an electrical signal received by each of the positive electrode and the negative electrode;
  generate a forward-connection electrical signal when the first detecting sub-module detects that the positive electrode receives a positive electrical signal provided by a power-supply device and the negative electrode receives a negative electrical signal provided by the power-supply device; and
  send, via the first transistor, the forward-connection electrical signal to the processor, in such a manner that the processor enters a normal working state.

2. The starting system of claim 1, further comprising:
a reverse-connection detecting module electrically connected with the processor and comprising a second detecting sub-module and a second transistor, wherein the second detecting sub-module is configured to:
  detect the electrical signal received by each of the positive electrode and the negative electrode;
  generate a reverse-connection electrical signal when the second detecting sub-module detects that the positive electrode receives the negative electrical signal and the negative electrode receives the positive electrical signal; and
  send, via the second transistor, the reverse-connection electrical signal to the processor, in such a manner that the processor enters an abnormality reminding state.

3. The starting system of claim 1, wherein
the starting system further comprises:
  a voltage detecting module electrically connected with the processor and configured to obtain an input voltage value according to the positive electrical signal and the negative electrical signal and to send in real time the input voltage value to the processor; and
the processor is configured to:
  control the starting system to work when a slope of the input voltage value decreases to a preset threshold slope and the processor is in the normal working state.

4. The starting system of claim 3, wherein
the starting system further comprises:
  a button module electrically connected with the processor and configured to send a button signal to the processor when the input voltage value is greater than or equal to a preset threshold voltage and the button module generates the button signal; and
the processor is further configured to:
  control, according to the button signal, the starting system to work.

5. The starting system of claim 1, wherein
the starting system further comprises:
  a current detecting module electrically connected with the processor and configured to obtain an input current value according to the positive electrical signal and the negative electrical signal when the starting system works and to send an interrupt electrical signal to the processor when the input current value is greater than a preset threshold current; and
the processor is configured to:
  control, according to the interrupt electrical signal, the starting system to stop working.

6. The starting system of claim 1, wherein
the starting system further comprises:
  a temperature detecting module electrically connected with the processor and configured to detect a temperature value of an electronic component in the starting system when the starting system works and to send an interrupt electrical signal to the processor when the temperature value is greater than a preset threshold temperature; and
the processor is configured to:
  control, according to the interrupt electrical signal, the starting system to stop working.

7. The starting system of claim 1, further comprising:
a short-circuit detecting module electrically connected with the processor and configured to:
  detect whether there is short circuit between the positive electrode and the negative electrode, when the positive electrode receives the positive electrical signal and the negative electrode receives the negative electrical signal; and
  send a short-circuit electrical signal to the processor when there is short circuit between the positive electrode and the negative electrode, in such a manner that the processor enters an abnormality reminding state.

8. The starting system of claim 7, wherein
the starting system further comprises:
  a reverse-connection detecting module electrically connected with the processor and configured to detect the electrical signal received by each of the positive electrode and the negative electrode and to generate a reverse-connection electrical signal when the reverse-connection detecting module detects that the positive electrode receives the negative electrical signal and the negative electrode receives the positive electrical signal; and
the short-circuit detecting module comprises:
  a first short-circuit detecting sub-module configured to detect whether there is short circuit between the positive electrode and the negative electrode, before the forward-connection detecting module generates the forward-connection electrical signal or the reverse-connection detecting module generates the reverse-connection electrical signal.

9. The starting system of claim 7, wherein the short-circuit detecting module further comprises:
  a second short-circuit detecting sub-module configured to detect whether there is short circuit between the positive electrode and the negative electrode, when the starting system works.

10. The starting system of claim 1, further comprising a communicating module configured to:
  store a communication protocol;
  perform data interchange, according to the communication protocol, with the power-supply device which provides the positive electrical signal and the negative electrical signal; and
  determine, according to the positive electrical signal and the negative electrical signal, whether an output capability of the power-supply device satisfies an output condition.

11. The starting system of claim 10, wherein the communicating module is configured to store any one of a controller area network (CAN) communication protocol and a vehicle area network (VAN) communication protocol.

12. The starting system of claim 1, further comprising:
  a state displaying module electrically connected with the processor and configured to display, under control of the processor, a working state of the starting system.

13. The starting system of claim 12, wherein the state displaying module comprises a light source and the processor is configured to:
control a color of the light source according to the working state of the starting system.

14. The starting system of claim 13, wherein the processor is configured to:
control the color of the light source to be a first color, when the working state of the starting system is an abnormal state; and
control the color of the light source to be a second color, when the working state of the starting system is the normal working state, wherein the first color is different from the second color.

15. The starting system of claim 14, wherein the first color is red and the second color is green.

16. The starting system of claim 12, wherein the state displaying module comprises a buzzer and the processor is configured to:
control, according to the working state of the starting system, the buzzer whether to sound.

17. The starting system of claim 16, wherein the processor is configured to:
control the buzzer to sound when the working state of the starting system is an abnormality reminding state.

18. The starting system of claim 1, wherein the forward-connection detecting module further comprises a first resistor, a second resistor, a third resistor, and a forward-connected diode, wherein
the first resistor has one end electrically connected with the positive electrode and the other end electrically connected with a base of the first transistor and one end of the second resistor;
the second resistor has the other end electrically connected with an emitter of the first transistor;
the third resistor has one end electrically connected with the processor and the other end electrically connected with a collector with the first transistor; and
the forward-connected diode has one end electrically connected with the emitter of the first transistor and the other end grounded.

19. The starting system of claim 18, further comprising a reverse-connection detecting module, wherein the reverse-connection detecting module comprises a second transistor, a fourth resistor, a fifth resistor, a sixth resistor, and a reverse-connected diode, wherein
the fourth resistor has one end grounded and the other end electrically connected with a base of the second transistor and one end of the fifth resistor;
the fifth resistor has the other end electrically connected with an emitter of the second transistor;
the sixth resistor has one end electrically connected with the processor and the other end electrically connected with a collector of the second transistor; and
the reverse-connected diode has one end electrically connected with the emitter of the second transistor and the other end electrically connected with the positive electrode.

20. An electric vehicle, comprising
a storage battery;
a positive electrode;
a negative electrode; and
the starting system of claim 1, wherein
a positive electrical signal generated by the storage battery is applied to the positive electrode and a negative electrical signal generated by the storage battery is applied to the negative electrode when the starting system works, in such a manner that the electric vehicle is started.

* * * * *